United States Patent Office 3,773,818
Patented Nov. 20, 1973

3,773,818
EQUILIBRATION OF CYANOALKYL POLYSILOXANES
George R. Siciliano, Ballston Lake, N.Y., assignor to General Electric Company
No Drawing. Filed Feb. 7, 1972, Ser. No. 224,255
Int. Cl. C07f 7/10
U.S. Cl. 260—448.2 E
16 Claims

ABSTRACT OF THE DISCLOSURE

Cyanoalkyl polysiloxanes are equilibrated by reacting in the presence of an alkali metal carbonate and/or alkaline earth metal carbonate catalyst.

BACKGROUND OF THE INVENTION

The present invention relates to the equilibration of cyanoalkyl polysiloxanes. More particularly, the present invention is concerned with equilibrating cyanoalkyl polysiloxanes in the presence of certain catalysts.

Prior to the present invention, various methods have been suggested for the equilibration or polymerization of cyanoalkyl polysiloxanes. One such process involves the equilibration of a cyanoalkyl polysiloxane with a strong acid such as concentrated sulfuric acid usually at moderate temperatures such as around room temperature. Such an equilibration reaction, however, is not entirely satisfactory. For instance, the sulfuric acid tends to hydrolyze cyano groups to amide type structures. Therefore, the polysiloxanes are usually treated after the equilibration to try to restore the cyano groups. However, such a restriction of the cyano groups is successful only to a limited extent.

The usual after-treatments to restore the cyano groups, such as water washing, which are somewhat practical, however, are not always effective for treating relatively high molecular weight polysiloxanes such as the high viscosity oils and gums. Accordingly, equilibration of cyanoalkyl polysiloxanes with sulfuric acid generally, with certain exceptions, has been limited to the preparation of relatively low molecular weight polysiloxanes such as the low viscosity oils. Also, these equilibrations are quite long and for many products are impractical from an industrial point of view.

In addition, cyanoalkyl polysiloxanes have been equilibrated at elevated temperatures without significantly affecting the cyanoalkyl group by employing certain hydroxides such as barium hydroxide as the catalyst. Such hydroxide catalysts can be used to prepare the relatively high molecular weight polysiloxanes. However, such processes suffer from the disadvantage that the viscosity control of the finished product is extremely poor. Usually it is necessary to rework the reaction product in order to obtain materials which satisfy the viscosity specifications for the particular product. That is, once the initial equilibration is completed, it may be necessary to add either additional chain stopper or additional cyanoalkyl polysiloxane to the product and reequilibrate to either lower or raise the viscosity to meet the desired specifications. Also, the reproducibility of a product from batch to batch is very poor. Furthermore, the necessity of reworking requires additional time which is extremely undesirable.

In addition, the equilibration employing such hydroxide catalysts requires neutralization after the equilibration is completed. This neutralization has been accomplished by treating the product with carbon dioxide gas. After neutralization, another process step such as vacuum stripping is necessary for removing the carbon dioxide. Moreover, minor amounts of metal carbonates may form because of the neutralization with the carbon dioxide, and accordingly, must also be separated from the product such as by filtration. Another disadvantage in the equilibration process employing these hydroxide catalysts is that the carbon dioxide may cause discoloration of the product.

It is therefore an object of the present invention to provide an improved equilibration process wherein the viscosity of the product can be controlled without the necessity of reworking the reaction product. Another object of the present invention is to provide a process which requires a minimum amount of processing steps.

Another object of the present invention is to provide an equilibration process which can be conducted at elevated temperatures and which will not significantly affect the cyanoalkyl groups.

Another object of the present invention is to provide an equilibration process which is generally applicable to the production of cyanoalkyl polysiloxanes irregardless of the desired molecular weight.

SUMMARY OF THE INVENTION

The present invention is concerned with a process for the equilibration of a composition containing cyanoalkyl polysiloxanes which comprises reacting cyanoalkyl polysiloxane represented by the recurring structure:

(1)

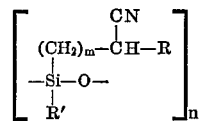

wherein R is hydrogen or an alkyl radical, R' is alkyl, aryl, aralkyl or alkaryl radicals; $m$ is a whole number from 0 to 5, inclusive, and $n$ is at least 2; in the presence of an effective catalytic amount of an equilibration catalyst represented by the formula:

wherein M is either an alkali metal or an alkaline earth metal, and $x$ is 2 when M is an alkali metal and $x$ is 1 when M is an alkaline earth metal.

DESCRIPTION OF PREFERRED EMBODIMENTS

The cyanoalkyl polysiloxanes which are equilibrated according to the process of the present invention are organosilicon compounds having a siloxane chain with at least one cyanoalkyl radical attached to silicon with the remaining valences of the silicon atoms, other than the valences which make up the siloxane chain, being satisfied by member of the class consisting of alkyl radicals, aryl radicals, aralkyl radicals, and alkaryl radicals.

The term "cyanoalkyl radical" refers to radicals of the formula:

(2)

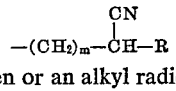

where R is hydrogen or an alkyl radical, e.g., methyl, ethyl, propyl, butyl, etc. and $m$ is a whole number equal to from 0 to 5, inclusive, and preferably is equal to from 0 to 3, inclusive. Usually the alkyl radicals represented by R contain from 1 to about 20 carbon atoms and preferably from 1 to 12 carbon atoms.

The cyanoalkyl polysiloxanes employed in the process of the present invention are linear and cyclic organopolysiloxanes represented by the recurring structure:

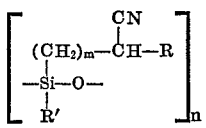

R is hydrogen or alkyl radicals. Usually the alkyl radical represented by R contains from 1 to about 20 carbon atoms and preferably 1 to 12 carbon atoms. Some examples of suitable alkyl radicals include methyl, ethyl, propyl, and butyl. Preferably R is hydrogen or methyl.

R' in Formula 1 above is a monovalent organic radical which may be an alkyl radical, an aryl radical, a cycloalkyl radical, an aralkyl radical or an alkaryl radical. Generally the alkyl radicals contain from 1 to about 20 carbon atoms, and preferably from about 1 to 10 carbon atoms. Some suitable alkyl radicals include methyl, ethyl, isopropyl, isobutyl, amyl, 2-ethyl hexyl, nonyl, decyl, and octadecyl. The most preferred alkyl radicals are methyl and ethyl. The aryl radicals suitable in the present invention include mononuclear and polynuclear radicals. Some suitable aryl radicals include phenyl, naphthyl, phenanthryl, and anthracyl, of which phenyl is the most preferred. Generally the aryl radicals contain from about 6 to 14 carbon atoms.

The cycloalkyl radicals suitable as R' in Formula 1 usually contain from about 3 to about 12 carbon atoms, and preferably from about 4 to 8 carbon atoms. Included among such cycloalkyl radicals are cyclopropyl, cyclobutyl, cyclopentyl, cyclohexyl, cycloheptyl, cyclooctyl, and cyclododecyl.

Generally the aralkyl radicals contain from 7 to about 18 carbon atoms. Included among such aralkyl radicals are phenylethyl and naphthylethyl. Usually the alkaryl radicals suitable as R' in Formula 1 contain from 7 to about 18 carbon atoms. Included among such alkaryl radicals are xylyl, tolyl, and cumyl. The preferred R' groups in Formula 1 are methyl and phenyl.

$m$ is a whole number equal to from 0 to 5, inclusive, and preferably is equal to from 0 to 3, inclusive.

$n$ is an integer to at least 2, e.g., from 2 to 20 or more.

Siloxane units of Formula 1 include, for example, cyanomethylmethylsiloxane, cyanomethylphenylsiloxane, $\beta$-cyanoethylethylsiloxane, $\beta$-cyanoethylmethylsiloxane, $\beta$-cyanopropylphenylsiloxane, etc.

Cyclopolysiloxanes which include the recurring unit of Formula 1 include sym-tetracyanomethyltetramethylcyclotetrasiloxane, sym-tetracyanomethyltetraphenylcyclotetrasiloxane, octacyanomethylcyclotetrasiloxane, etc.

Linear organopolysiloxanes which may be equilibrated according to the process of the present invention include those containing a plurality of siloxane units of Formula 1 condensed alone to form oils or elastomers containing 1 or 2 silicon-bonded cyanoalkyl radicals per silicon. Such linear polysiloxanes contain typical terminal groups such as the trimethylsilyl, triethylsilyl, triphenylsilyl, etc., radicals.

Mixtures and/or intercondensed polysiloxanes of two or more of the above-described organopolysiloxanes can be equilibrated according to the method of this invention, if desired. In addition mixtures and/or intercondensed polysiloxanes containing a major quantity of one or more of the above-described cyanoalkyl polysiloxanes with a minor quantity of siloxanes having units of the structure:

(2)
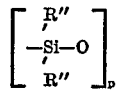

can be employed in the process of the present invention. Such mixtures usually contain at least about 50 mole percent and preferably at least about 85 mole percent of the cyanoalkyl polysiloxanes represented by Formula 1. $p$ is an integer equal to at least 2, e.g., from 1 to 20 or more, and R'' is an alkyl, aryl, cycloalkyl, aralkyl, or alkaryl radical of the class defined above for R' in Formula 1. Siloxane units of Formula 2 include, for example, dimethylsiloxane, diethylsiloxane, methylphenylsiloxane, etc. Cyclopolysiloxanes containing the unit of Formula 1 intercondensed with the units of Formula 2 include, for example, cyanomethylpentamethylcyclotrisiloxane, cyanoethylheptaethylcyclotetrasiloxane, cyanomethyltetramethylpentaphenylcyclopentasiloxane, cyanomethylheptamethylcyclotetrasiloxane, etc.

Also, included are liquid, linear organopolysiloxanes containing the siloxane units of both Formulas 1 and 2. By controlling the proportions of the two types of siloxane units, the ratio of cyanoalkyl radicals to silicon may vary within any desired limits. Thus, oils may be formed containing from two cyanoalkyl radicals per silicon atom to one cyanoalkyl radical per 2 or 3 or more silicon atoms. In addition elastomers containing the intercondensed siloxane units of Formulas 1 and 2 are included as suitable materials to be equilibrated according to the process of this invention.

The cyanoalkyl organopolysiloxanes employed in the process of the present invention can be prepared according to the procedure disclosed in U.S. Pat. 3,185,663 to Prober and assigned to the same assignee as in the present case, disclosure of which is incorporated herein by reference. For instance, the cyanoalkyl organopolysiloxanes may be prepared from chlorinated organopolysiloxane compounds which are well known in the art. Many of these chlorinated organopolysiloxane compounds and their methods of preparation are described in the following patents: 2,435,148, McGregor et al.; 2,439,669, Nordlander; 2,444,858, Speier; 2,457,539, Elliott et al.; 2,491,833, Sauer; 2,507,316, McGregor et al.; 2,507,519, Goodwin, Jr.; 2,510,148, Speier; 2,513,924, Elliott et al.; 2,522,053, McGregor et al.; 2,589,446, Sommer. The chloroalkyl organosilicon compounds which may be used as starting materials all contain the

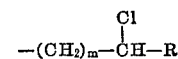

group where $m$ and R are as defined as above. The Grignard reagent of these chloroalkyl compounds is prepared in the usual fashion and added dropwise to a solution of cyanogen in diethyl ether. The addition of the Grignard polysiloxane to cyanogen takes place without the addition of any heat. Since cyanogen boils below −20° C., it is preferable to carry out the Grignard addition at temperatures below the point. Suitable temperatures for the reaction are from about −50° C. to about 0° C. The ratio of cyanogen to chloroalkyl radicals may vary within wide limits, e.g., from about 0.25 mole to 3.0 moles cyanogen per mole of chloroalkyl radicals. However, about one mole of cyanogen per mole of chloroalkyl radical is prepared. In addition, cyanoalkylpolysiloxanes, suitable as starting materials in the present process, can be obtained by hydrolyzing a cyanoalkyl dichlorosilane with a hydrolyzing agent such as sodium bicarbonate, in the presence of an inert reaction diluent. Some suitable reaction diluents include aromatic hydrocarbons such as toluene, benzene, and xylene; saturated aliphatic hydrocarbons such as hexane and heptane; and cycloaliphatic hydrocarbons such as cyclohexane.

The equilibration catalysts employed in the present invention are represented by the formula:

(3) 

wherein M is an alkali metal or an alkaline earth metal, and $x$ is 2 when M is an alkali metal and $x$ is 1 when M is an alkaline earth metal. Some alkali metals and alkaline earth metals which are suitable constituents of the metal carbonate catalyst of Formula 3 above include sodium, potassium, lithium, cesium, rubidium, francium, calcium, magnesium, barium, strontium, and radium. The preferred metal carbonates employed in the present invention are sodium carbonate and calcium carbonate. Generally the catalyst is employed in amounts ranging from about 0.01 to about 1% by weight based upon the total weight of polysiloxane material to be equilibrated. Preferably the catalyst is present in an amount of about 0.1 to about 0.5% by weight based upon the material to be equilibrated.

In addition, the process of this invention may be carried out in the absence or in the presence of a chain stopper. The chain stoppers which may be employed are known compounds which have been previously suggested for such a purpose. Illustrative of some suitable examples of chain stoppers include hexamethyldisiloxane, tetramethyldiethoxysilane, monoethyltriethoxysilane, diethyltetraethoxydisiloxane, tetramethyldimethoxyethoxydisiloxane, and divinyltetraethoxydisiloxane. In addition cyanoalkyldisiloxanes of the formula:

(4) 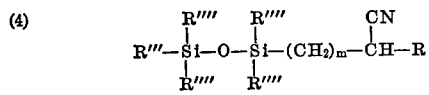

are suitable chain stoppers. R and $m$ are the same as R and $m$ defined above in Formula 1. The R''' radical and the various R'''' radicals are the same or different members selected from the class consisting of alkyl radicals as defined for R; aryl radicals, e.g., phenyl, naphthyl, diphenyl, etc., radicals; and

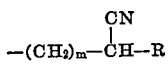

radicals, where R has the meaning given above. Preferably, only the R''' radical is the

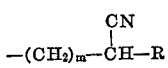

radical and the R'''' radicals are alkyl or aryl. Some specific examples of such disiloxanes include cyanomethylpentamethyldisiloxane, cyanomethyldimethyltriethyldisiloxane, bis-(cyanomethyl)-tetramethyldisiloxane, β-cyanoethylpentaethyldisiloxane, and ω-cyanopropylpentapropyldisiloxane. In addition, when a linear polysiloxane having a degree of polymerization greater than a disiloxane is present in the equilibration, chain stopper is, of course, introduced into the reaction by the terminal groups of the linear polysiloxane.

The viscosity or chain length of the final product depends primarily upon the relative amounts of the cyanoalkylpolysiloxane and other polysiloxane, if present, and chain stopper, and not upon the initial viscosity of the cyanoalkylpolysiloxane and other polysiloxane, if present. Therefore, the relative amounts of chain stopper and cyanoalkylpolysiloxane and other polysiloxane, if present, will vary depending upon the viscosity or chain length desired in the final product. Such relative amounts can readily be determined once the desired chain length or viscosity is selected. For instance, no chain stopper would be added when the highest possible chain length is desired. Accordingly, such ratio between the chain stopper and the other polysiloxanes can vary over a relatively wide range.

The equilibration reaction is generally carried out at elevated temperatures from about 150 to about 250° C. In addition, the reaction is usually carried out at atmospheric pressure. Of course, higher or lower pressures can be employed if desired. The time necessary to effect the equilibration is primarily dependent upon the particular reactants employed and upon the quantity and specific catalyst. In certain instances it may be desirable to remove relatively low molecular weight polysiloxanes formed during the equilibration from the product such as by vacuum distillation. This vacuum distillation if employed should be carried out in the presence of the catalysts of this invention to guard against the formation of cyclics forming in the product.

The specific catalysts disclosed herein provide an equilibration process wherein the viscosity or chain length of the product can be controlled well within the usual specifications for such materials. Accordingly, the use of the present catalysts eliminates the necessity of having to rework the initial equilibration product to achieve the necessary viscosity to be within the product specifications. In turn, the overall cycle time for equilibration can be reduced by approximately one half as compared to employing a hydroxide catalyst. Moreover, the present catalysts eliminate the necessity of employing a neutralization step and accordingly eliminate the possibility of discoloration occurring due to treatment with the carbon dioxide as previously experienced. In addition, the present catalyst provides an equilibration process which does not affect the cyanoalkyl groups to any noticeable extent.

The cyanoalkyl polysiloxanes prepared according to the present invention are useful in applications where it is desirable to modify the properties of organopolysiloxane oils and gums. The cyanoalkyl silicone oils are valuable as lubricants and as hydraulic fluids. The cyanoalkyl silicone rubbers are valuable in coating operation and are particularly valuable when formed into gaskets which must come into contact with hydrocarbon solvents.

The following non-limiting examples are given wherein all parts are by weight unless the contrary is stated to further understand the present invention.

EXAMPLE 1

To a jacketed reaction vessel equipped with a stirrer and condenser are added under a nitrogen atmosphere 5,000 parts of toluene. 2,815 parts of sodium bicarbonate are then added with agitation. A mixture of 1,227 parts of toluene and 2,270 parts of methyl-β-cyanoethyldichlorosilane is added with agitation to the reaction mass over a period of about 1½ hours. The temperature of the reaction mass during this addition is maintained between about 20 and 25° C. The reaction mass is then agitated for an additional 15 minutes while maintaining the temperature between 20 and 25° C., after which the reaction mixture is heated to temperature in excess of 105° C. to effect azeotropic distillation of the water of hydrolysis. The distillation is continued for a period of about 3 hours, at which time the reaction mass is cooled to about 70 to 75° C. The reaction product is then washed with 5,000 parts of water at a temperature of 70–75° C. The wash water is added to the reaction product and agitation is continued for about 10–15 minutes. Then the water and reaction mass are allowed to settle for about 30–45 minutes, after which the water and reaction product are separated from each other. This washing is repeated an additional three times with the last wash containing about 91 parts of sodium bicarbonate. The reaction mass is then heated to reflux under a vacuum at a pressure of about 120–140 mm. Hg to a temperature of 70° C. to distill any water remaining from the washing steps.

The reaction mixture is cooled to 30 or 40° C. and filtered. The filtrate is heated with agitation under vacuum at a pressure of about 100 mm. Hg to a temperature of 110–115° C. At 110–115° C., the vacuum is increased to a pressure of 20 mm. and distillation is continued for about an hour, at which time 1,405 parts of a hydrolysis product containing a mixture of cyclic methyl-β-cyanoethylpolysiloxanes having a viscosity of 465 centipoises are obtained.

To a jacketed reaction vessel equipped with a stirrer are charged under a nitrogen atmosphere 400 parts of this mixture of cyclic methyl-β-cyanoethylpolysiloxanes having a viscosity of about 465 centistokes at 25° C.; 37.2 parts of trimethylsiloxy chain-stopped linear methyl-β-cyanoethylpolysiloxane having 10.1% by weight terminal trimethylsiloxy units and an average formula of:

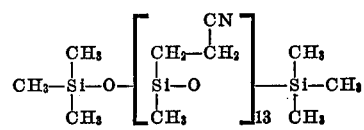

and 2 parts of $Na_2CO_3$.

The reaction mass is heated to a temperature of 200° C. The reaction is continued for 3 hours. The reaction mass is then cooled to 150° C. and stripped of lower molecular weight siloxanes by heating to 175° C. under a reduced pressure of 20 mm. Hg while bubbling nitrogen therethrough. The product is then filtered to remove the sodium carbonate. 394 parts of an equilibrated methyl-β- cyanoethylpolysiloxane having a viscosity of 36,000 centistokes at 25° C. are obtained. The specification for this particular material is 37,500±12,500 centistokes.

It is quite apparent from this example that the process of this invention provides excellent viscosity control.

EXAMPLE 2

To a jacketed reaction vessel equipped with a stirrer are charged 400 parts of a mixture of cyclic methyl-β-cyanoethylpolysiloxanes as prepared in Example 1 having a viscosity of about 465 centistokes at 25° C.; 44.4 parts of trimethylsiloxy chain-stopped linear methyl-β-cyanoethylpolysiloxane having 10.1% by weight terminal trimethylsiloxy units and an average formula of:

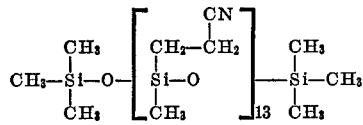

and one part of $CaCO_3$. The reaction mixture is heated to a temperature of 200° C. The reaction is continued at this temperature for 2 hours with agitation. The reaction mass is then cooled to 150° C. and stripped of lower molecular weight siloxanes by heating to 175° C. under a reduced pressure of 20 mm. Hg while bubbling nitrogen therethrough. The product is then filtered to remove the calcium carbonate. 400 parts of an equilibrated cyanoalkylpolysiloxane having a viscosity of 17,800 centistokes at 25° C. are obtained.

What is claimed is:

1. Process for the equilibration of cyanoalkyl polysiloxanes which comprises reacting cyanoalkyl polysiloxane represented by recurring structure:

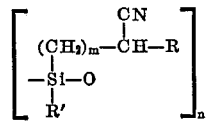

wherein any unit of the recurring structure may be different, R is selected from the group of hydrogen and alkyl radicals having from one to about eight carbon atoms, R' is a member selected from the class of alkyl radicals, aryl radicals, cyanoalkyl radicals, aralkyl radicals, and alkaryl radicals having from one to about fifteen carbon atoms, $m$ is a whole number, equal to from 0 to 5, inclusive, and $n$ is greater than 2; in the presence of an effective catalytic amount of an equilibration catalyst represented by the formula $M_xCO_3$ wherein M is selected from the group consisting of alkali metals and alkaline earth metals; and $x$ is 2 where M is alkali metal and $x$ is 1 when M is alkaline earth metal.

2. The process of claim 1 wherein $m$ is 1 and R is hydrogen.

3. The process of claim 1 wherein R' is methyl.

4. The process of claim 1 which is carried out at a temperature from about 150 to 250° C.

5. The process of claim 1 which is carried out in the presence of a chain stopper.

6. The process of claim 5 wherein said chain stopper is added in the form of a trimethylsiloxy chain stopped linear methyl-β-cyanoethylopolysiloxane.

7. The process of claim 1 wherein said catalyst is present in an amount from about 0.01 to about 1% by weight of the composition.

8. The process of claim 1 wherein said catalyst is present in an amount from about 0.1 to about 0.5% by weight of the composition.

9. The process of claim 1 wherein said catalyst is $Na_2CO_3$.

10. The process of claim 1 wherein said catalyst is $CaCO_3$.

11. The process of claim 1 wherein said cyanoalkyl polysiloxane contains a cyclic organopolysiloxane.

12. The process of claim 11 wherein said cyclic organopolysiloxane is a cyclic methyl-β-cyanoethylsiloxane.

13. The process of claim 12 which is carried out at a temperature from about 150–250° C.; wherein said catalyst is present in an amount from about 0.1 to about 0.5% by weight of the composition and is $Na_2CO_3$ or $CaCO_3$.

14. The process of claim 13 which is carried out in the presence of a chain stopper.

15. The process of claim 14 wherein said cyanoalkylpolysiloxane is a mixture of cyclic methyl-β-cyanoethylsiloxane and a trimethylsiloxy chain-stopped linear methyl-β-cyanoethylpolysiloxane.

16. The process of claim 15 wherein said linear methyl-β-cyanoethylpolysiloxane has the average formula:

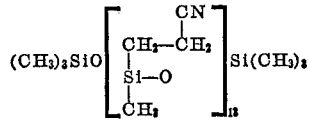

References Cited
UNITED STATES PATENTS

| | | | |
|---|---|---|---|
| 3,484,469 | 12/1969 | Guinet et al. | 260—448.2 E |
| 3,590,064 | 6/1971 | Lacefield | 260—448.2 E |

DANIEL E. WYMAN, Primary Examiner

P. F. SHAVER, Assistant Examiner

U.S. Cl. X.R.

260—46.5 E, 46.5 R